Oct. 8, 1968

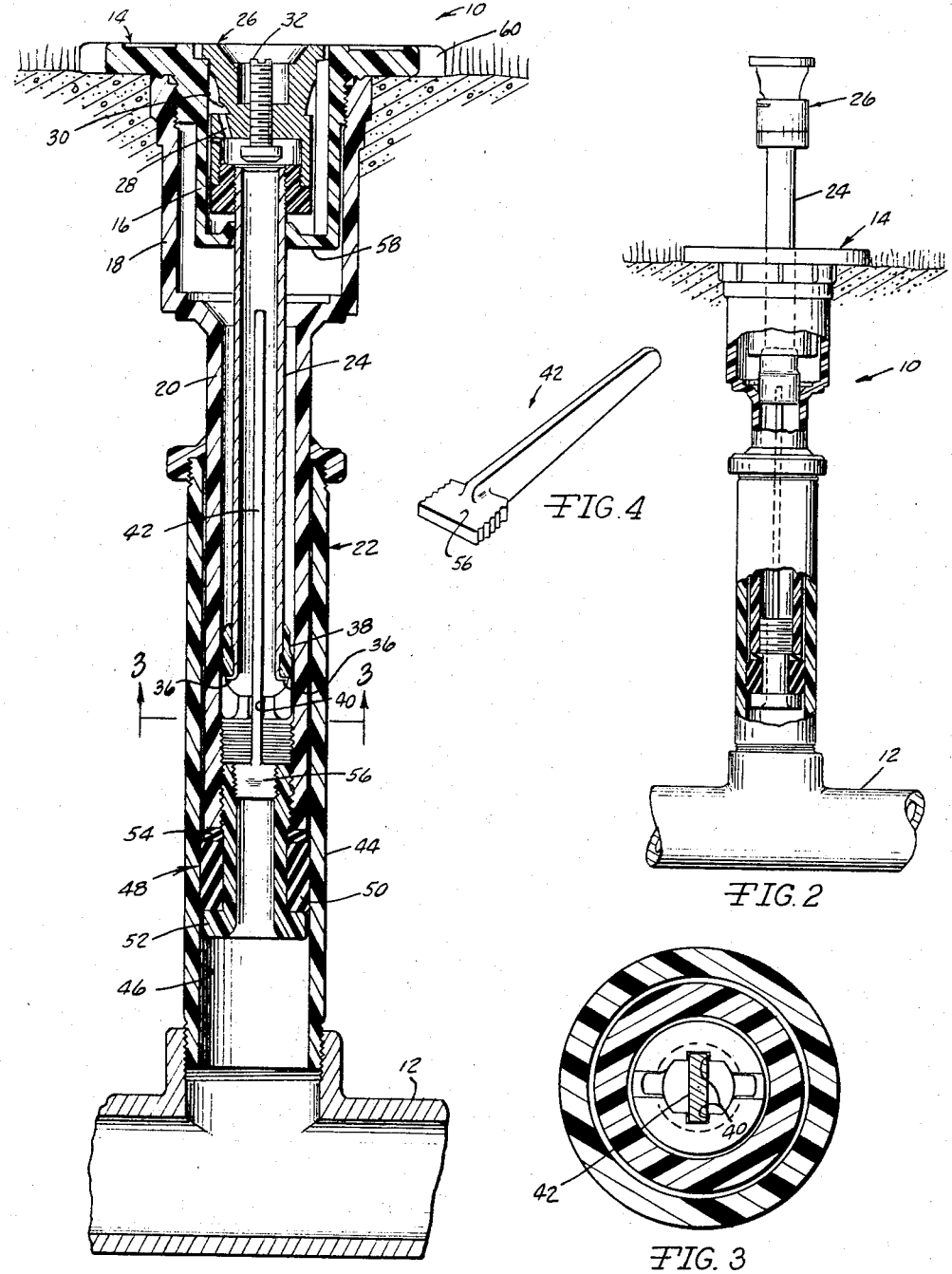

W. J. TRICKEY 3,404,840

POP-UP HEAD FOR SPRINKLER SYSTEM

Filed Oct. 22, 1965

INVENTOR.
WILLIAM J. TRICKEY

BY *Olsen and Stephenson*
ATTORNEYS

United States Patent Office 3,404,840
Patented Oct. 8, 1968

3,404,840
POP-UP HEAD FOR SPRINKLER SYSTEM
William J. Trickey, East Lansing, Mich., assignor to Mahogany Corporation, Williamston, Mich., a corporation of Michigan
Filed Oct. 22, 1965, Ser. No. 500,656
15 Claims. (Cl. 239—204)

ABSTRACT OF THE DISCLOSURE

An apparatus for use with underground lawn sprinkler systems, such apparatus having an adjustable riser section for positioning the sprinkler head at a selected elevation above an underground water supply conduit, and a pop-up spray nozzle adapted to be elevated in response to water pressure in said conduit.

---

The present invention relates to water sprinkler systems, and particularly to riser assemblies for such systems that are adjustable in height and which include spray nozzles which are responsive to water pressure in the system to be raised to an operative position above the level of the sprinkler head.

In lawn sprinkler systems, water supply conduits are installed below the lawn surface and connected to sprinkler heads by a vertical riser. In systems such as this, it is desirable that the sprinkler head be disposed flush with the ground. For purposes such as this, adjustable risers have been developed, such as is disclosed by way of example in United States Letters Patent No. 3,084,869 and pending application Ser. No. 452,695, filed May 3, 1965, now Patent No. 3,369,828. In risers of the type shown in the aforesaid patent and the pending application, the riser is vertically adjustable so that during installation a more simplified procedure can be followed for locating the sprinkler head flush with the surface of the ground than was possible with other types of prior art devices.

Not only is it desirable that the sprinkler head be disposed flush with the ground, but it is also desirable that the sprinkler assembly include a spray nozzle which can be elevated to a position above the sprinkler head in response to water pressure in the lawn sprinkler system so that the sprinkling operation of the spray nozzle will not be affected by surrounding grass or other obstructions. Lawn sprinkler assemblies of this type may be referred to as "pop-up" sprinklers because they automatically pop-up to an elevated position in response to liquid pressure in the water supply line, and they descend to their normal seated positions within the sprinkler heads when the supply of water is interrupted. In making installations of pop-up sprinkler assemblies in the past, various problems have arisen.

One of the problems that exists in connection with prior art devices is that of installing the sprinkler head in a simple manner so that it will be flush with the ground when installed and so that it can easily be re-adjusted at a subsequent date, after the ground has settled, to assure that the sprinkler head again does not project above the surface of the ground. A second problem which exists when installing a sprinkler system of this type is that of flushing the system quickly and easily to remove dirt and other water flow impediments which may inadvertently have dropped into the risers or the underground conduits during installation of the sprinkler system. When carrying on the flushing operation, it is desirable to be able to remove the sprinkler heads so that the flushing operation can be carried out quickly and properly, and thereafter to reinstall the spray nozzles and to reset the sprinkler heads at their proper levels in a minimum of time and with a minimum of labor. Still another problem that exists with prior art devices is that of replacing defective spray nozzles or of changing to new nozzles having different spray characteristics. Such operations in the past have been unduly time consuming and troublesome to perform.

It is one of the objects of the present invention to provide an improved lawn sprinkler assembly which is constructed and arranged to facilitate simple and rapid installation and which subsequently can easily be re-adjusted so that the sprinkler head will always be flush with the ground.

It is another object of the present invention to provide an improved lawn sprinkler assembly which is constructed and arranged so that the sprinkler head thereof can easily be opened to allow rapid flushing of the sprinkler system during installation.

It is another object of the present invention to provide an improved sprinkler assembly which is constructed and arranged so that the sprinkler nozzle can easily be removed during the flushing operation or subsequently thereafter when it is desired to replace the sprinkler nozzle with a new nozzle or with one of a different design.

It is another object of the present invention to provide an improved sprinkler assembly which is constructed so that it employs a sprinkler nozzle which is responsive to pressure in the system to elevate the nozzle above the level of the surrounding lawn area.

It is another object of the present invention to provide a lawn sprinkler assembly of the foregoing character which is constructed and arranged so that the pop-up nozzle, when in its elevated position, will always be held so that it sprays in the proper direction.

It is still another object of the present invention to provide a sprinkler assembly which is constructed and arranged so that a nozzle unit thereof may readily be replaced when a defective nozzle is present or when a nozzle of a different spray characteristic is desired.

Other objects of this invention will appear in the following description and appended claims, reference being had to the accompanying drawings forming a part of this specification wherein like reference characters designate corresponding parts in the several views.

In the drawings:

FIGURE 1 is a vertical sectional view of a lawn sprinkler assembly embodying one form of the present invention, showing the spray nozzle thereof in a seated position;

FIGURE 2 is a vertical elevation of the embodiment, partly in section and drawn to a reduced scale, showing the spray nozzle in its elevated position;

FIGURE 3 is an enlarged section taken on the line 3—3 of FIG. 1;

FIGURE 4 is a perspective view of one of the components of the illustrated embodiment;

Figure 5:
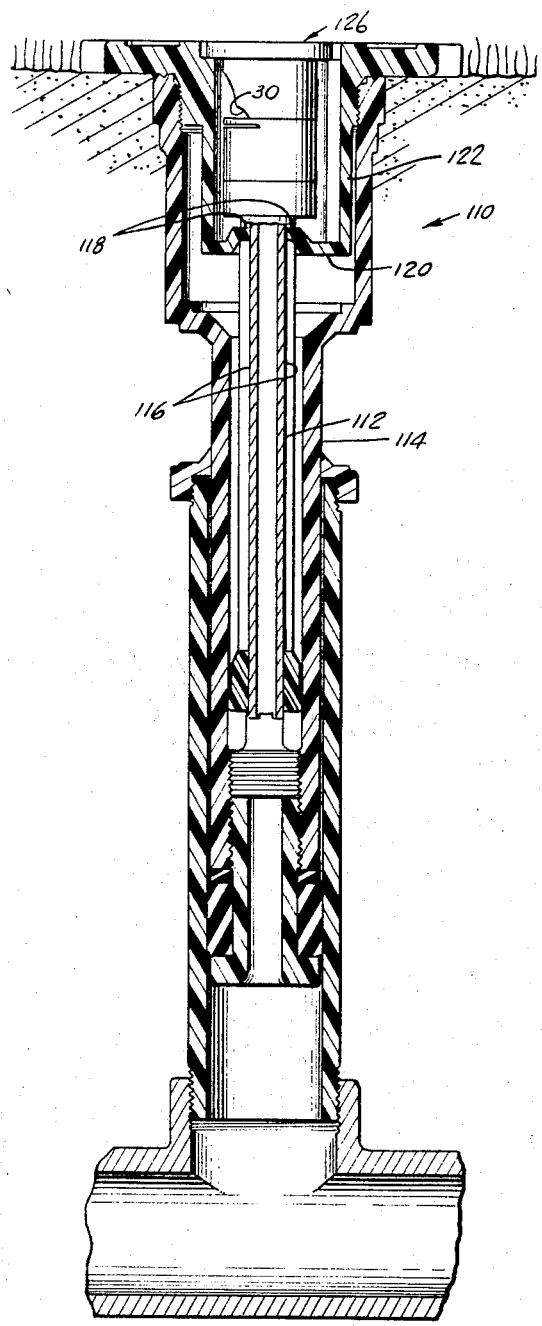
FIGURE 5 is a vertical sectional view of a lawn sprinkler assembly embodying another form of the present invention, showing the sprinkler nozzle thereof in a seated position.

Before explaining the present invention in detail, it is to be understood that the invention is capable of other embodiments and of being practiced or carried out in various ways. It is also to be understood that the phraseology or terminology employed therein is for the purpose of description and not of limitation.

Referring now to the drawings, the embodiment of the invention shown in FIGS. 1–4 will be described in greater detail. As there shown, the lawn sprinkler assembly 10 is connected to a conduit 12 which is part of a lawn sprinkler system. The lawn sprinkler assembly 10 includes the sprinkler head 14 which is formed of a two-piece construction having an inner housing or housing element 16 threadedly connected at its upper end to the outer housing 18. The latter is an integral part of the circular conduit or riser element 20 which is a part of the vertical riser assembly 22. Extending into the upper end of the conduit 20 is a hollow vertical stem 24 which is axially movable within the conduit 20. Threadedly connected to the upper end of the stem 24 is a spray nozzle 26 which may be of any suitable design. The illustrated spray nozzle 26 is one which is designed to spray water in a pattern of less than 360° for use adjacent to walks, buildings and the like. It includes a duct 28 for directing the water to the circumferentially limited outlet slot 30. The water flows in the conventional manner through the stem 24, the duct 28 and outlet slot 30. Positioned within the spray nozzle 26 for adjusting the flow of water is the adjustment screw 32.

Retained on the bottom of the stem 24 by means of the outwardly flared tangs 36 is an annulus 38, preferably formed of nylon. The annulus 38 has two axially extending grooves or slots 40 therein, which are diametrically opposed and are adapted to receive opposite edges of the tongue 42 which is threadedly connected to conduit 20 in a manner to be described. By virtue of this arrangement, the stem 24 can travel axially within the conduit 20, but it is restricted against rotational movement relative thereto. This assures that the sprinkler nozzle 26 will always remain oriented in a fixed position when in its elevated position, and thereby, the spray pattern of the water from the nozzle 26 will always be in the intended direction.

The details of the vertical adjustable riser 22 will be described briefly, and for a more detailed description of the same, reference is made to copending application Ser. No. 452,695, filed May 3, 1965. The vertical adjustable riser 22 has a lower tubular section 44 which has a noncircular internal bore 46. In the present instance the internal bore is an octagonal section, but any suitable noncircular construction may be employed. Threadedly connected to the lower end of the conduit 20 is a locking assembly 48 which includes a resilient annulus 50 which is adapted to be expanded radially outwardly to lock the conduit 20 in any desired vertical position merely by turning the outer housing 18 on the upper end of conduit 20 so as to cause rotation of the conduit relative to the locking assembly 48. The latter will be held against rotation by the noncircular members 52 and 54 which in this instance are octagonal members that mate with the octagonal interior of conduit 20. It will be observed that when the locking assembly 48 is held against rotation while the conduit 20 is turned, the members 52 and 54 will move axially with respect to each other either to increase or to decrease the axial compression on the annulus 48, and thereby either expand or allow contraction radially of the annulus 48 for holding or releasing the lower tubular section 44.

The member 52 of the locking assembly 48 is threaded at its upper inner end, to which the threaded end 56 of the tongue 42 is attached. By virtue of this arrangement, the stem 24 can be inserted into the conduit 20 and over the tongue 42, and with the latter fitted into grooves 40, the stem 24 can move axially but not rotationally relative to the conduit 20.

In normal operation, when water pressure in the conduit 12 has acted on the effective areas of stem 24 and nozzle 26 to raise the nozzle 26 to the elevated position shown in FIG. 2, the annulus 38 will be in engagement with the lower wall 58 which has a hole through which the stem 24 extends. Thus, the lower wall 58 of the inner housing element 16 functions to limit the extent of upward movement of the nozzle assembly comprising the nozzle 26 and attached stem 24. Also, the nozzle assembly is restricted to axial movement by the stationary tongue 42 which is fixedly attached to the circular conduit 20 by means of the locking assembly 48.

It will be observed that the illustrated construction and arrangement assures that the spray nozzle 26 and attached stem 24 will always return to the seated position shown in FIG. 1. The inner opening in the wall 58 is adapted to receive snugly the outer dimension of stem 24, and the lower end, or annulus 38, is adapted to travel in close engagement with the circular inner wall of the conduit 20. These spaced bearing points assure that there will be substantially no lateral movement of the stem 24 with respect to the conduit 20. Thus, the stem 24 will not become cocked so as to be out of vertical alignment, and therefore, the stem 24 and attached nozzle 26 will always be reseated after pressure is interrupted in conduit 12.

One of the features of the present invention is the ease with which the present embodiment can be installed. As was explained in copending application, Ser. No. 452,695, the elevation of the sprinkler head 14 can readily be set at any elevation above the level of the conduit 12 in the underground sprinkler system, merely by loosening the locking assembly 48 by turning the head 14 relative to the lower conduit section 44. The upper conduit 20 is then free to move axially relative to lower conduit section 48 until such time as the locking assembly 48 is again tightened by turning head 14.

When the present invention is used in the installation of a sprinkler system, the normal procedure after laying the underground conduits, connecting the risers and refilling the dirt, will be to remove the inner housing element 16 from outer housing 18 and withdraw the inner housing element together with the spray nozzle 26 and connected stem 24. The adjustable riser 22 would then be set at its highest position. Water can then be allowed to flow through the sprinkler system to flush out any dirt or other undesirable material that may inadvertently have entered the system during installation. After the flushing has been completed, the spray nozzle and its stem 24 and the inner housing element 16 can be reinserted in place within the outer housing 18, and the sprinkler head 14 can be lowered and secured in place at ground level merely by turning the head 14 by means of the spanner wrench fittings 60.

In its normal operation, the spray nozzle will be seated within the chamber defined by the inner housing element 16. When water is introduced under pressure into the system 12, the pressure will act on the effective areas of the underside of the stem 24 and spray nozzle 26 to raise them to the elevated position shown in FIG. 2. Two axially spaced bearings for the stem 24 are always present to assure that the stem 24 will constantly remain in a vertical position. As explained, these bearing points are provided at the opening in the inner housing element 16 and at the annulus 38. Thus, cocking of the nozzle and stem, as so often occurs in prior art devices, is avoided, and on interruption of the water pressure, the nozzle and stem will drop freely to their normal seated positions.

Figure 6:
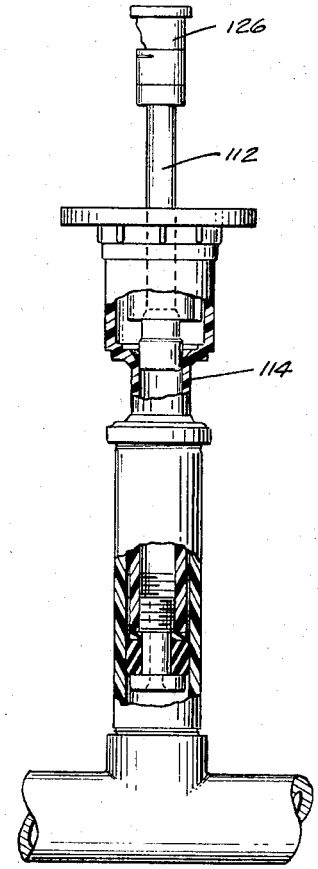
FIGURE 6 is a vertical elevation of the embodiment of FIG. 5, partly in section and drawn to a reduced scale, showing the spray nozzle in its elevated position.

A modified form of the invention is shown in FIGS. 5 and 6 to which reference is now made. As there shown, a lawn sprinkler assembly 110 is illustrated which is similar to the construction previously described, but a different arrangement is provided for preventing rotational movement of the stem 112 relative to the conduit or riser element 114, while at the same time permitting relative axial movement therebetween.

In the present embodiment the stem 112 has axially extending ribs 116 on opposite sides which are adapted to travel in axially extending slots 118 in the bottom wall 120 in inner housing element 122. Thus, the nozzle 126 and attached stem 112 can move axially relative to conduit 114, but will be restricted against relative rotational movement.

Figure 7:
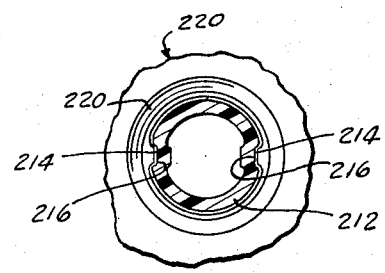
FIGURE 7 is an enlarged section of still another form of the sprinkler assembly.

It will be recognized that the same cooperation between parts can be accomplished merely by reversing the tongue and groove arrangement, as shown in the modification of FIG. 7. As there shown, the stem 212 has grooves 124 therein into which extend the axially directed ribs or tongues 216 in the bottom wall 220 of the inner housing section 222.

In the embodiments described, it will be observed that the nozzle assemblies and the inner housing sections can easily be removed to replace such units with other units having nozzles for providing different spray patterns, or to replace such units which may be out of repair with new ones.

Having thus described my invention, I claim:

1. A lawn sprinkler assembly for an underground sprinkler system comprising a vertical riser element defining a circular water passageway extending axially through its lower portion and having a sprinkler head for a spray nozzle at its upper end, said sprinkler head including an outer housing integral with said vertical riser element and an inner housing element removably secured to said outer housing and defining in its interior a spray nozzle chamber open at the top and having a lower wall, a spray nozzle assembly including a spray nozzle normally seated in said chamber and an axially movable hollow vertical stem having an upper end attached to and communicating with said spray nozzle and a circular lower end extending through asid lower wall into said lower portion for free movement therein, said spray nozzle assembly being responsive to water pressure in said vertical riser element to be elevated out of said chamber to a position wherein said spray nozzle is a predetermined distance above its normal seated position, and first means on one of said elements cooperating with second means on said spray nozzle assembly to restrict said spray nozzle assembly from turning while allowing axial movement thereof.

2. A lawn sprinkler assembly as claimed in claim 1 wherein said first means comprises at least one groove extending in an axial direction in said inner housing element, and said second meanns comprises a rib extending axially on the external surface of said stem for sliding engagement within said groove.

3. A lawn sprinkler assembly for an underground sprinkler system comprising a vertical riser including a lower riser element, an upper riser element telescoped thereinto and a locking assembly attached to the lower end of said upper riser element for securing said upper riser element to the lower riser element at a desired elevation, said upper riser element having a circular conduit defining a water passageway extending axially through its lower portion and having a sprinkler head for receiving a spray nozzle at its upper end, said sprinkler head including an outer housing forming an extension of said circular conduit and an inner housing element removably secured to said outer housing and defining in its interior a spray nozzle chamber open at the top and having a lower wall, a spray nozzle assembly including a spray nozzle normally seated in said chamber and an axially movable hollow vertical stem having an upper end attached to and communicating with said spray nozzle and a lower end extending through said lower wall into said circular conduit for free movement therein, said spray nozzle assembly being responsive to water pressure in said vertical riser to be elevated out of said chamber to a position wherein said spray nozzle is a predetermined distance above its normal seated position, and means engaging said nozzle assembly for restricting movement thereof to axial movement.

4. A lawn sprinkler assembly as claimed in claim 3 wherein saaid means comprises axially extending ribs on said stem and grooves in said inner housing element into which said ribs fit.

5. A lawn sprinkler assembly for an underground sprinkler system comprising a vertical riser element having a sprinkler head for receiving a spray nozzle at its upper end, said sprinkler head including an outer housing forming an extension of said element and an inner housing element defining in its interior a spray nozzle chamber open at the top and having a lower wall, a spray nozzle assembly including a spray nozzle normally seated in said chamber and an axially movable hollow stem having an upper end attached to and communicating with said spray nozzle and a lower end extending downwardly through said lower wall into said vertical riser element for free movement therein, said spray nozzle assembly being responsive to water pressure in said vertical riser element to be urged upward out of said chamber to an elevated position, said inner housing element including means to limit upward movement of said spray nozzle assembly beyond said elevated position and being removable from said outer housing so that said inner housing element and the spray nozzle assembly can be removed as a unit from the lawn sprinkler assembly.

6. A lawn sprinkler assembly as claimed in claim 5 wherein said housing element and said spray nozzle assembly include cooperating means for restricting to axial movement the relative movement allowed between the housing element and the spray nozzle assembly.

7. A removable unit in a lawn sprinkler assembly comprising a spray nozzle and a hollow stem having an upper end attached to and communicating with said spray nozzle and a lower end adapted to extend into a riser of the lawn sprinkler assembly, and a housing element defining a chamber open at the top and having a lower wall in which said spray nozzle is normally seated, the lower wall having an opening through which said stem can move axially, said lower wall cooperating with said spray nozzle and hollow stem to limit the extent of such axial movement, and cooperating means on said stem and said lower wall to restrict said stem against rotational movement relative to said housing element, said housing element having means for removably securing it within an outer housing of a sprinkler head of the lawn sprinkler assembly.

8. A lawn sprinkler assembly for an underground sprinkler system comprising a vertical riser element defining a circular water passageway extending axially through its lower portion and having a sprinkler head for a spray nozzle at its upper end, said sprinkler head including an outer housing integral with said vertical riser element and an inner housing element removably secured to said outer housing and defining a spray nozzle chamber, a spray nozzle assembly including a hollow vertical stem having an upper end attached to and communicating with said spray nozzle and a circular lower end extending into said lower portion for free movement therein, said spray nozzle assembly being responsive to water pressure in said vertical riser element to be elevated to a position wherein said spray nozzle is a predetermined distance above its normal seated position, and first means on one of said elements cooperating with second means on said spray nozzle assembly to restrict said spray nozzle assembly from turning while allowing axial movement thereof, said first means comprising a tongue connected to said riser element so as to extend vertically upward into said hollow stem, and said second means comprising at least one groove in said hollow stem in sliding engagement with said tongue.

9. A lawn sprinkler assembly for an underground sprinkler system comprising a vertical riser including a lower riser element, an upper riser element telescoped thereinto and a locking assembly attached to the lower end of said upper riser element for securing said upper riser element to the lower riser element at a desired elevation, said upper riser element having a circular conduit defining a water passageway extending axially through its lower portion and having a sprinkler head for receiving a spray nozzle at its upper end, said sprinkler head including an outer housing forming an extension of said circular conduit and an inner housing element removably secured to said outer housing and defining a spray nozzle chamber, a spray nozzle assembly including a spray nozzle normally seated in said chamber and an axially movable hollow vertical stem having an upper end attached to and communicating with said spray nozzle and a lower end extending into said circular conduit for free movement therein, said spray nozzle assembly being responsive to water pressure in said vertical riser to be elevated to a position wherein said spray nozzle is a predetermined distance above its normal seated position, a tongue secured to said locking assembly and extending into said stem, said stem having axially extending grooves into which said tongue extends for restricting movement of said nozzle assembly to axial movement.

10. A lawn sprinkler assembly for an underground sprinkler system comprising a vertical riser defining a water passageway therethrough and having a sprinkler head for a spray nozzle at its upper end, said sprinkler head including an outer housing integral with said vertical riser and an inner housing removably secured to said outer housing and defining in its interior a spray nozzle chamber open at the top and having a lower wall with a stem opening therein, a spray nozzle normally seated in said chamber, a hollow vertical stem extending through said stem opening for axial movement relative to said lower wall and having an upper end attached to and communicating with said spray nozzle and a lower end extending into and communicating with said vertical riser, said spray nozzle and attached stem being retained from removal from the sprinkler assembly by the lower wall of said inner housing and being removable from the sprinkler assembly when said inner housing is released from the said outer housing.

11. A lawn sprinkler assembly as claimed in claim 10, wherein said spray nozzle and attached stem are responsive to water pressure in said vertical riser to be elevated to a position wherein said spray nozzle is a predetermined distance above its normal seated position.

12. A lawn sprinkler assembly as claimed in claim 10, wherein means are included for selectively extending the effective length of said vertical riser so that said sprinkler head can be elevated temporarily to a position above the ground and the assembly can be flushed by removing the inner housing and the spray nozzle and attached stem.

13. A lawn sprinkler assembly as claimed in claim 12, wherein when said inner housing is secured said spray nozzle and attached stem are responsive to water pressure in said vertical riser to be elevated to a position wherein said spray nozzle is a predetermined distance above its normal seated position.

14. A lawn sprinkler assembly as claimed in claim 10, wherein means are included for selectively extending the effective length of said vertical riser and for securing the vertical riser in a set position by turning said outer housing.

15. A lawn sprinkler assembly as claimed in claim 14, wherein said vertical riser includes means for cooperating with said stem for maintaining the preset radially oriented position of the spray nozzle.

References Cited

UNITED STATES PATENTS

| | | | |
|---|---|---|---|
| 1,892,959 | 1/1933 | Lippert | 239—206 |
| 2,031,754 | 2/1936 | Bacigalupi | 239—201 |
| 2,506,032 | 5/1950 | McKinley | 239—204 |
| 2,812,977 | 11/1957 | Phillips | 239—204 |
| 2,879,946 | 3/1959 | Stipek | 239—204 |
| 2,981,481 | 4/1961 | Hruby | 239—206 |
| 2,989,246 | 4/1961 | Sloane | 239—204 |
| 2,990,120 | 6/1961 | Reynolds | 239—204 X |
| 3,034,728 | 5/1962 | Hruby | 239—206 |
| 3,084,869 | 4/1963 | Hutty et al. | 239—201 |
| 3,268,173 | 8/1966 | Costa | 239—206 |

M. HENSON WOOD, JR., *Primary Examiner.*

V. M. WIGMAN, *Assistant Examiner.*